(12) United States Patent
Urban et al.

(10) Patent No.: US 9,544,669 B2
(45) Date of Patent: Jan. 10, 2017

(54) ROUTING IN A WDM-BASED PON

(71) Applicant: Telefonaktiebolaget L M Ericsson (publ), Stockholm (SE)

(72) Inventors: Patryk Urban, Vällingby (SE); Jiajia Chen, Kista (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/647,433

(22) PCT Filed: Dec. 4, 2012

(86) PCT No.: PCT/SE2012/051342
§ 371 (c)(1),
(2) Date: May 26, 2015

(87) PCT Pub. No.: WO2014/088480
PCT Pub. Date: Jun. 12, 2014

(65) Prior Publication Data
US 2015/0326956 A1    Nov. 12, 2015

(51) Int. Cl.
*H04B 10/00* (2013.01)
*H04Q 11/00* (2006.01)
(Continued)

(52) U.S. Cl.
CPC ...... *H04Q 11/0067* (2013.01); *G01M 11/3127* (2013.01); *G01M 11/3136* (2013.01);
(Continued)

(58) Field of Classification Search
CPC .................................................. H04B 10/071
See application file for complete search history.

(56) References Cited

U.S. PATENT DOCUMENTS

| | | | |
|---|---|---|---|
| 8,693,866 B1 * | 4/2014 | Lam | H04B 10/071 398/13 |
| 9,020,349 B2 * | 4/2015 | Chen | G01M 11/3127 398/10 |

(Continued)

FOREIGN PATENT DOCUMENTS

| | | | | |
|---|---|---|---|---|
| SE | WO 2012128677 A1 * | 9/2012 | ........ | G01M 11/3127 |
| WO | 2012128677 A1 | 9/2012 | | |
| WO | 2013028110 A1 | 2/2013 | | |

OTHER PUBLICATIONS

International Search Report and Written Opinion for International Application No. PCT/SE2012/051342, mailed Oct. 23, 2013, 12 pages.

(Continued)

*Primary Examiner* — Danny Leung
(74) *Attorney, Agent, or Firm* — Nicholson De Vos Webster & Elliott LLP (57) ABSTRACT

It is disclosed a remote node connectable to multiple feeder fibers from one or more central offices, COs, of a wavelength division multiplexing-based passive optical network, WDM-based PON. The remote node comprises one or more splitters each configured to receive a monitoring signal on a connected feeder fiber and to split the monitoring signal into split monitoring signals, wherein the monitoring signal uses one wavelength at a time out of a group of different wavelengths, and an arrayed waveguide grating, AWG, with output ports connectable to drop fibers. The AWG is configured to route the split monitoring signals to output ports of said AWG based on a currently used wavelength of said group of different wavelengths, for supervising drop fibers connected to the output ports. Also, a method for a remote node in the WDM-based PON, of routing a monitoring signal, is disclosed.

12 Claims, 7 Drawing Sheets

(51) Int. Cl.
*H04J 14/02* (2006.01)
*H04B 10/071* (2013.01)
*G01M 11/00* (2006.01)

(52) U.S. Cl.
CPC ........ *H04B 10/071* (2013.01); *H04J 14/0204* (2013.01); *H04J 14/0238* (2013.01); *H04J 14/0275* (2013.01); *H04J 14/0282* (2013.01); *H04Q 2011/0032* (2013.01)

(56) References Cited

U.S. PATENT DOCUMENTS

| | | | |
|---|---|---|---|
| 9,231,696 B2* | 1/2016 | Urban | |
| 2006/0153567 A1* | 7/2006 | Kim | H04J 14/02 398/72 |
| 2006/0165412 A1* | 7/2006 | Jung | H04J 14/0226 398/71 |
| 2006/0222364 A1* | 10/2006 | Chung | H04B 10/0771 398/72 |
| 2008/0062408 A1* | 3/2008 | Lai | H04J 14/0282 356/73.1 |
| 2008/0291431 A1* | 11/2008 | Wang | G01M 11/3136 356/73.1 |
| 2009/0263123 A1* | 10/2009 | Zhu | H04B 10/071 398/16 |
| 2010/0316372 A1* | 12/2010 | Chang | H04B 10/0771 398/12 |
| 2010/0316373 A1* | 12/2010 | Chang | H04B 10/071 398/12 |
| 2011/0255860 A1* | 10/2011 | Lee | G01M 11/3136 398/12 |
| 2013/0223841 A1* | 8/2013 | Lee | H04J 14/0232 398/72 |
| 2013/0259466 A1* | 10/2013 | Chen | G01M 11/3127 398/5 |
| 2015/0326956 A1* | 11/2015 | Urban | H04B 10/071 398/16 |

OTHER PUBLICATIONS

P.J. Urban et al., "WDM-PON Fiber-Fault Automatic Detection and Localization with 1 dB Event Sensitivity in Drop Links," OFC/NFOEC Technical Digest, Jan. 23, 2012, 3 pages.

S. Kamei et al., "N × N Cyclic-Frequency Router With Improved Performance Based on Arrayed-Waveguide Grating," Journal of Lightwave Technology, vol. 27, No. 18, Sep. 15, 2009, pp. 4097-4104.

P.J. Urban et al., "OTM- and OTDR-based cost-efficient Fiber Fault Identification and Localization in Passive Optical Network," OSA/OFC/NFOEC, 2011, 3 pages.

P.J. Urbal et al., "Cost-Efficient Remote PON Monitoring Based on OTDR Measurement and OTM Functionality," Tu. C6.1, ICTON, IEEE, 2011, pp. 1-4.

European Search Report for Application No. 12889720.4, mailed Jun. 22, 2016, 9 pages.

* cited by examiner

ROUTING IN A WDM-BASED PON

CROSS-REFERENCE TO RELATED APPLICATIONS

This application is a National stage of International Application No. PCT/SE2012/051342, filed Dec. 4, 2012, which are hereby incorporated by reference.

TECHNICAL FIELD

This disclosure relates to a remote node for a wavelength division multiplexing-based passive optical network, WDM-based PON, where the remote node is connectable to multiple feeder fibers. The disclosure also relates to a method of routing a monitoring signal in a remote node connectable to multiple feeder fibers of a WDM-based PON.

BACKGROUND

Due to trends towards higher bandwidth demands and advances in the WDM device technology, WDM PONs are considered to be promising candidates for next-generation broadband access networks.

Besides, the growing popularity of mobile data services is also placing increasing demands on backhaul. WDM-PONs are able to provide symmetrical ultra-high bandwidth to base stations and hence can easily address the growing capacity needs of mobile backhaul. Faults occur in PONs, e.g. due to breaks in an optical fiber or due to a deteriorating or non-functioning optical line terminal (OLT) or optical network terminal (ONT). In order to shorten the service provision down-time caused by a failure in a PON, effective monitoring should be applied enabling fault detection and fault localization.

Figure 1:
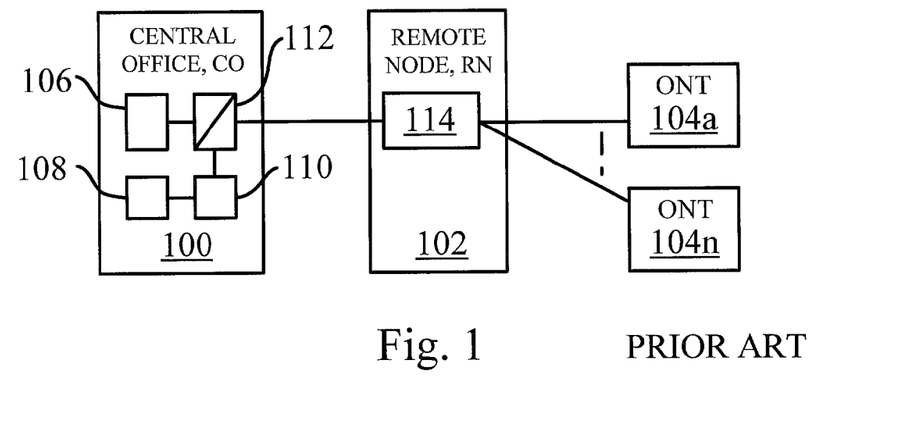
FIG. 1 schematically illustrates an architecture for monitoring a WDM-PON, according to the prior art.

FIG. 1 presents an exemplary WDM-based PON enabling monitoring. The WDM-based PON comprises a central office (CO) 100, a remote node (RN) 102 and multiple ONTs 104a-n. The CO 100 comprises an OLT 106, an optical time domain reflectometry (OTDR) device 108, as well as an external wavelength adaptation module (EWAM) 110 and a wavelength filter 112.

The OTDR device 108 generates a monitoring signal that can be wavelength adapted or tuned in EWAM 110 and in the wavelength filter 112 after it is provided to the RN 102 and further to the ONTs 104a-n of the WDM-PON. The RN 102 distributes the monitoring signal via drop fibers to the ONTs based on the wavelength of the monitoring signal. Any reflection and/or scattering by the WDM-PON is returned towards the CO and the OTDR-device, based on which the WDM-PON can be supervised.

High connection availability and low failure impact by any single failure is required, in particular for business access and mobile backhauling. For this reason, protection of feeder fibers (FFs) is often a main task by operators.

Figure 2:
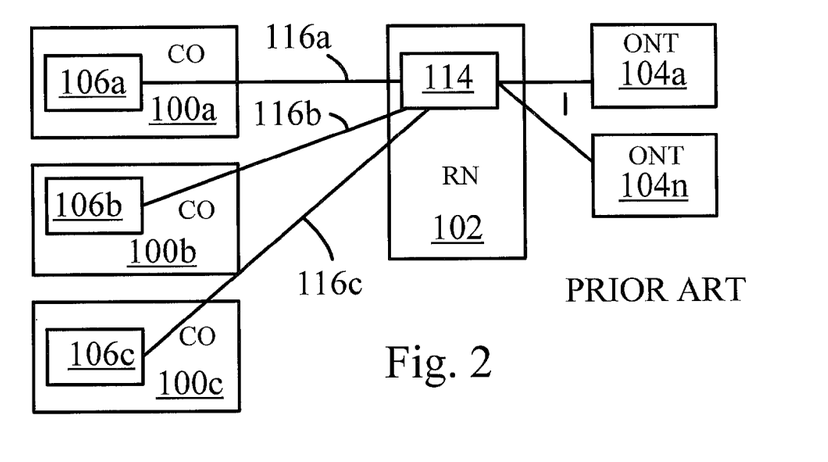
FIG. 2 schematically illustrates an architecture of a WDM-PON with disjoint feeder fibers according to the prior art.

FIG. 2 schematically presents a WDM-PON architecture with a plurality of COs 100a-c connected to a RN 114 via disjoint FFs 116a-c. This architecture supports open access since a user can choose a service from any CO. These COs are generally geographically spread. Each CO has an OLT for sending data in the WDM-based PON.

Figure 3:
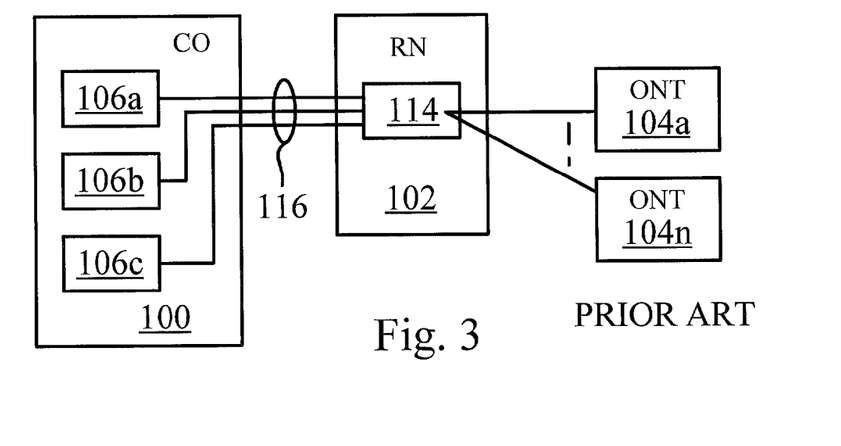
FIG. 3 schematically illustrates an architecture of a WDM-PON with joint feeder fibers according to the prior art.

FIG. 3 schematically presents another WDM-PON architecture with a single CO 100 having a plurality of OLTs 106a-c connected to a RN via joint FFs 116. This architecture supports resilience since several FFs are provided from one and the same CO.

In order to provide connection protection and improved reliability, FIGS. 2 and 3 present WDM-PON architectures with multiple FFs.

By providing a plurality of different COs open access is enabled for customers. This promotes competition and market diversity, as this concept means a degree of freedom in the network architecture to offer a choice of services to residential and business users. For instance, open access allows users to select one out of a plurality of different service/network providers.

The schematically presented WDM-PONs of FIGS. 2 and 3, provide open access on a wavelength level. Within these architectures, the users can freely choose the service among the available service providers (SPs)/network providers (NPs) by selecting a certain wavelength. This idea for open access may be extended to any type of WDM-based PONs, e.g. hybrid WDM/time division multiplexing (TDM) PON.

However, the supervision mechanism as presented in FIG. 1 cannot be directly applied to the PON architectures with multiple FFs as presented in FIGS. 2 and 3, i.e. for open access and resilience.

There is therefore a need for enabling an improved monitoring of a WDM-based PON with multiple FFs.

SUMMARY

It is an object of embodiments of the invention to address at least some of the issues outlined above, and this object and others are achieved by the remote node and the method of routing a monitoring signal according to the appended independent claims, and by the embodiments according to the dependent claims.

A first embodiment provides a remote node for a WDM-based PON which remote node is connectable to multiple feeder fibers from one or more COs of the WDM-based PON. The remote node comprises one or more splitters each configured to receive a monitoring signal on a connected feeder fiber and to split the received monitoring signal, wherein the monitoring signal uses one wavelength at a time out of a group of different wavelengths. The remote node also comprises an arrayed waveguide grating (AWG) that is provided with output ports connectable to drop fibers. The AWG is configured to receive said split monitoring signals, and to route the monitoring signals to output ports of said AWG based on the currently used wavelength of said group of different wavelengths, for supervising drop fibers connected to the output ports.

A second embodiment provides a method for a remote node in a WDM-based PON, of routing a monitoring signal, wherein the remote node is connected to multiple feeder fibers from one or more COs. The method comprises receiving a monitoring signal on a feeder fiber, where said monitoring signal uses one wavelength at a time out of a group of different wavelengths. The method also comprises splitting said monitoring signal, and routing the monitoring signals by an AWG to output ports of said AWG based on the currently used wavelength of said group of different wavelengths, for supervising drop fibers connected to the output ports.

It is an advantage with embodiments that they support completely passive optical distribution networks and can be applied to any WDM-based PON having an AWG, for example pure WDM PON, hybrid WDM/TDM PON etc.

A further advantage with embodiments is that they can support resilience or open access in a WDM-based PON with monitoring functionality.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

Embodiments of the present invention concern a remote node and a method of routing a monitoring signal. This monitoring signal may be an optical time domain reflectometry (OTDR) signal. By applying embodiments of the present invention, groups of drop links or drop fibers, can be measured simultaneously at a time via embedded monitor output ports in a remote node (RN). This a clear advantage as compared to sequentially monitoring output ports of the RN.

Supervising drop fibers comprises subjecting drop fibers to monitoring signals and receiving scattered and/or reflected signals from said drop fibers.

A remote node configured to route a monitoring signal, is hence also configured to route scattered and/or reflected signals in an opposite direction from an output to an input, of a remote node. For instance, as a monitoring signal is split and routed from the input to the output, reflected and/or scattered signals returned into the output of a remote node can be routed and merged into a response signal on the input of the remote node. This response signal may then be provided via feeder fibers to one or more COs for a comparison with a reference signal enabling fault detection and localization of the drop fiber of a WDM-PON.

Figure 4:
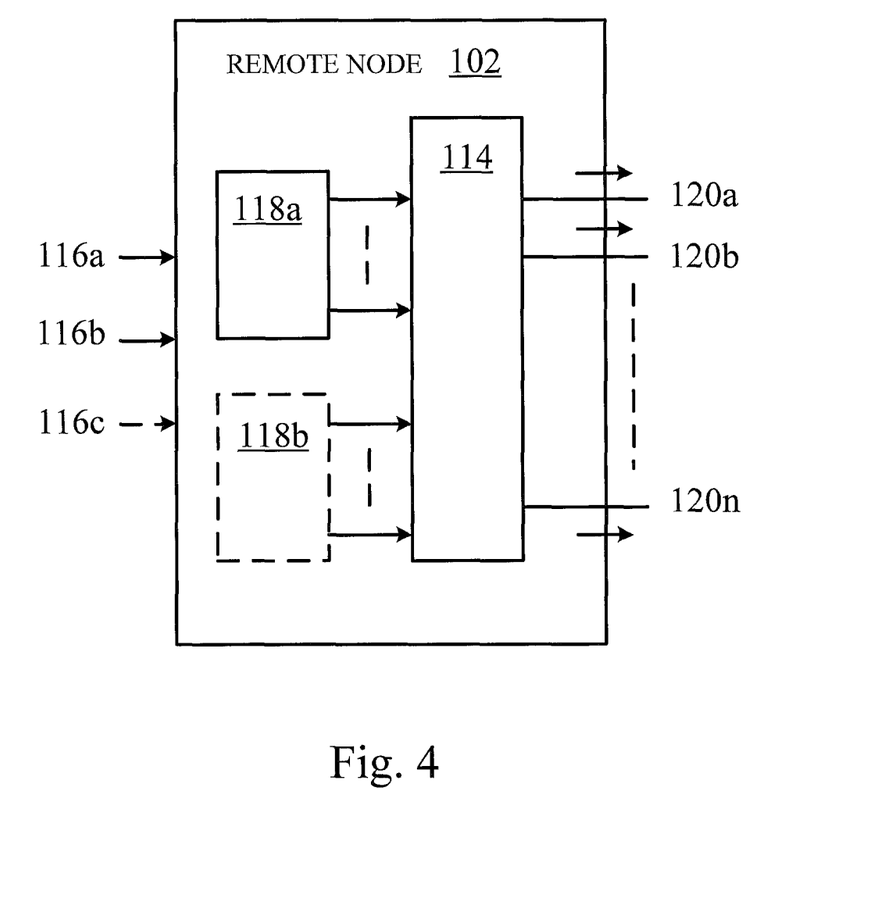
FIGS. 4-8 schematically present examples of remote node architectures according to embodiments of the invention.

FIG. 4 presents a remote node 102 for a WDM-based PON, according to embodiments of the invention. The remote node 102 is connectable to multiple feeder fibers, schematically illustrated by feeder fibers 116a-c, from one or more COs of the WDM-based PON. The remote node 102 comprises one or more splitters, schematically illustrated by splitters 118a and 118b. Said one or more splitters are configured to receive a monitoring signal on a connected feeder fiber and to split the monitoring signal. The monitoring signal uses one wavelength at a time out of a group of different wavelengths. The remote node also comprises an arrayed waveguide grating (AWG) 114 that is provided with output ports that are connectable to drop fibers of the WDM-based PON. Output ports of the AWG are illustrated by 120a-n. The AWG is further configured to receive said split monitoring signals, and to route the split monitoring signals to output ports of said AWG, based on the currently used wavelength out of said group of different wavelengths, for supervising drop fibers connectable to the output ports.

An AWG is typically provided to route a signal based on the wavelength of said signal. A data signal fed into an AWG is routed to the output ports of the AWG dependent on the wavelengths of the data signal. An AWG can therefore be used to separate a data signal having multiple wavelengths into wavelength selective signals.

For the purpose of embodiments of this invention, the AWG present in a remote node may be used for routing purposes of monitoring signals in order to enable monitoring of drop fibers connected to output ports of the AWG.

Each splitter of remote node may be provided with a number of output ports, and the number of output ports of the AWG 114 divided by the number of output ports of each splitter 118 may correspond to the number of required wavelengths in the group of wavelengths for supervising drop fibers connected to output ports of the AWG.

The one or more splitters 118 of the remote node may have K output ports, and the AWG 114 may have a frequency difference $\Delta f$ between consecutive output ports of the AWG, wherein the wavelengths in the group of wavelengths are such that the frequencies, corresponding to said wavelengths in the group of wavelengths, are spaced by $K \times \Delta f + n \times$ Free Spectrum Range of the AWG, n being an integer.

Letting the number of the output ports of the AWG be equal to the number of drop fibers N, the free spectrum range becomes $FSR = N \times \Delta f$. By injecting a monitoring signal using a wavelength into the AWG the monitoring signal is routed to output ports based on the current wavelength of monitoring signal. By using each one of the group of different wavelengths as the current wavelength of the monitoring signal, an output signal will be routed to all output ports of the AWG.

Figure 5:
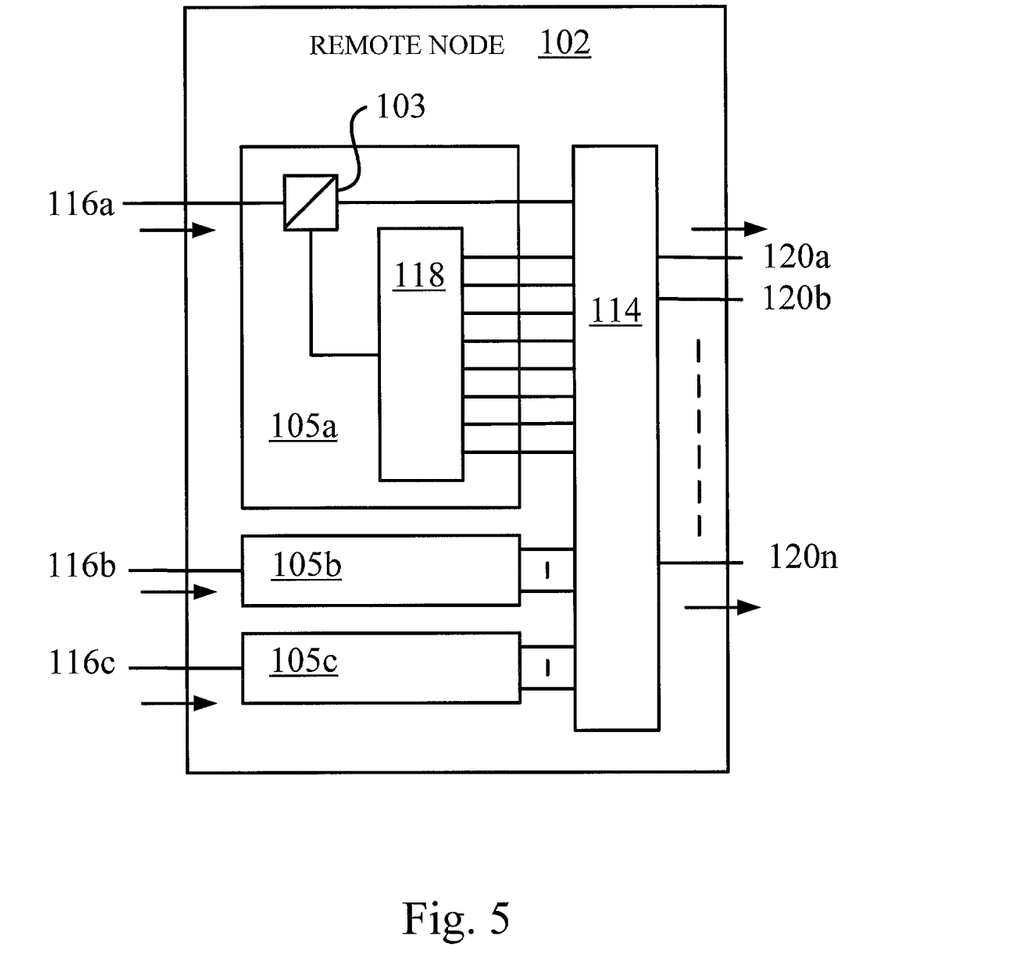

With reference to FIG. 5 an example of a remote node 102 according to another embodiment of the invention is now presented. This remote node 102 is connectable to multiple disjoint feeder fibers illustrated by 116a-c, from one or more COs of a WDM-based PON. The remote node 102 further comprises a splitter 118 and a wavelength filter 103 for each feeder fiber 116a-c connectable to the remote node 102. For illustrative purposes, each such connected wavelength filter 103 and splitter 118, are grouped into a module. Since the example as presented in FIG. 5 is connectable to three disjoint feeder fibers, the same number of modules 105a-c are comprised in said figure.

The wavelength filter 103 of each module 105a-c is configured to separate or filter out a monitoring signal from a combination of data signals and a monitoring signal. In each module, a filter 103 is connected to the input of a splitter 118.

The output of each splitter 118 is connected to the AWG 114. The output ports 120a-120n of the AWG are provided to be connectable to drop fibers of a WDM-based PON.

The monitoring signal comprises one wavelength at a time out of a group of wavelengths. Each splitter 118 is provided to split a monitoring signal received on each feeder fibre 116a-c. The AWG 114 is configured to route the monitoring signals to output ports of said AWG, based on the currently used wavelength out of said group of wavelength, for supervising drop fibers connectable to the output ports of the AWG 114.

Since an AWG is configured to route signals based on the wavelength of the signals, different wavelengths of the monitoring signals are routed differently. Upon injection of different wavelengths from one splitter to the AWG, a monitoring signal will be provided on each output port of the AWG. For this reason, a monitoring signal can be fed into all drop fibers of a WDM-based PON.

The AWG typically has M input ports and N output ports, forming an M×N type of an AWG, where M≤N. It is however noted that this AWG may be realized by a NXN AWG in which only M input ports are used.

The AWG is further configured to receive data signals injected into one port of an M×N AWG. The splitter is configured to receive a monitoring signal on its input. The K output ports of a 1:K splitter are configured to be connected to K other input ports of the AWG.

The choice of the number of output ports of the splitter, i.e. K, is a trade-off between the number of drop fibers to be supervised simultaneously and the sensitivity of the supervision. To reach a certain minimum dB event sensitivity, a 1:K splitter where K≤8, N/K being an integer may be employed. For instance, K=8, means a signal reduction of 9 dB of the monitoring signal when monitoring 8 simultaneous drop fibers. A choice of K=16, means a signal reduction of 12 dB of the monitoring signal. A choice of monitoring 16 simultaneous drop fibers risks to attenuate the monitoring signal too much. A choice of K=4 only leads to a 6 db reduction in signal intensity at the cost of only 4 simultaneous drop fibers being supervised.

The required number of wavelengths as comprised in the monitoring signal in order to monitor all drop fibers, is the number of drop fibers, or output ports of the AWG, divided by K. According to this embodiment of the invention, the number of input ports of the AWG is M, where M=(K+1)×L, where L denotes the total number of COs, corresponding to L employed disjoint FFs.

For instance, if the WDM-based PON has 32 drop fibers and the RN has a 1:K splitter employed, where K=8, a number of 32/8=4 monitoring wavelengths are required for monitoring all drop fibers per module. The M×N AWG is then accordingly a 27×32 AWG.

Denoting the output wavelengths of the AWG by $\lambda_1$ to $\lambda_N$, the wavelengths for monitoring drop fibers 1 to N may be chosen as $[\lambda_i, \lambda_{i+K}, \lambda_{i+2K}, \ldots, \lambda_{i+N-K}]$+n×FSR, n≥1, where FSR is the free spectrum range of the AWG. For instance, the monitoring signal can comprise of $\lambda_1, \lambda_{1+8}, \lambda_{1+2\times8}, \ldots, \lambda_{1+32-8}$, n×FSR, i.e. $\lambda_1, \lambda_9, \lambda_{17},$ and $\lambda_{25}$, +n×FSR.

By using $\lambda_1$+n×FSR as one wavelength for the input to a splitter, the same wavelength $\lambda_1$+n×FSR will be found on the output ports of the splitter, with the difference that the intensity is lowered by a factor of 1/K since the signal is shared among all K output ports. Since the K output ports of the splitter are connected to the AWG, K input ports of the AWG will be fed with $\lambda_1$+n×FSR.

Considering the first module 105a, the monitoring signal in the form of $\lambda_1$+n×FSR is applied to the input ports number 2 to 9. The nature of an AWG is such that when applying various wavelengths to an input port, within the AWG each wavelength will be deviated based on its wavelength. Applying $\lambda_1$ to $\lambda_{32}$ onto input port No. 1 of an AWG, the wavelengths will be ordered on the output ports according to decreasing wavelength or increasing frequency. Wavelength $\lambda_1$ is routed to output port No. 1, wavelength $\lambda_2$ to output port No. 2, and so on, and wavelength $\lambda_{32}$ is routed to output port No. 32. Generally, when applying $\lambda_i$ to input port j, wavelength $\lambda_i$ is routed to output port No. i+j−1 of the AWG. This fact is used for the monitoring signal in order to provide a monitoring wavelength on all output ports of the AWG enabling supervision of drop fibers connected to output ports of the AWG.

Since the routing by the AWG has a cyclic nature due to the free spectrum range, denoting the number of output ports of the AWG by N, the output port to which a wavelength $\lambda_i$ is routed when injected to input port No. j, is O=(i+j−1). If the AWG is about to route a wavelength to an output port O, where O>N, the actual port number to which said wavelength is routed is port No. O−N.

Applying wavelength $\lambda_1$ on input port 2-9 of the AWG, wavelength $\lambda_1$ will also be routed to output ports 2-9 of the AWG simultaneously. This is because $\lambda_1$ passes straight through the AWG, in the sense that when applied to input port No. j, it will be routed to output No. j also. Hence, by using frequency $\lambda_1$+n×FSR as a first monitoring wavelength applied to K input ports of the AWG, the wavelength $\lambda_1$+n×FSR will be routed to K simultaneous output ports of the AWG.

By choosing a second monitoring wavelength as $\lambda_{1+K}$+n×FSR, here as $\lambda_9$+n×FSR, and applying this second wavelength to input ports 2-9 of the AWG, wavelength $\lambda_9$+n×FSR will be routed to output ports 10-17 of the AWG. Wavelength $\lambda_9$+n×FSR applied to input port 2, results in $\lambda_9$+n×FSR being routed to output port 9+2−1=10. Wavelength $\lambda_9$+n×FSR applied to input port 9, results in $\lambda_9$+n×FSR being routed to output port 9+9−1=17. Accordingly, wavelength $\lambda_9$+n×FSR applied to input port 3-8, results in $\lambda_9$+n×FSR being routed to output port 11-16, respectively.

Accordingly, by choosing a third monitoring wavelength as $\lambda_{17}$+n×FSR and applying these to input ports 2-9 of the AWG, wavelength $\lambda_{17}$+n×FSR will be routed to output ports 18-25. Finally, by choosing a fourth monitoring wavelength as $\lambda_{25}$+n×FSR and applying these to input ports 2-9 of the AWG, wavelength $\lambda_{25}$+n×FSR will be routed to output ports 26-32 as well as to output port 1 of the AWG. Wavelength $\lambda_{25}$+n×FSR applied to input ports 2-8 will be routed to output ports 26-32 of the AWG. Wavelength $\lambda_{25}$+n×FSR applied to input port 9 will hence be routed to output port 1 of the AWG. 25+9−1=33, since 33>32, the port number onto which the signal is found, will be 33−32=1. This is due to the cyclic frequency property of the AWG, where each frequency period is denoted the FSR.

In the case the monitoring signal is received on a working feeder fiber, a wavelength filter 103 is provided in the remote node to separate the monitoring wavelengths from the data signals. In order to enable this separation, n is chosen to be 1 or more for the monitoring wavelengths.

It should be noted that the monitoring wavelengths for a second and third module, may also be chosen to be $\lambda_1, \lambda_9, \lambda_{17},$ and $\lambda_{25}$, +n×FSR. Moreover, other wavelengths may of course be chosen for monitoring drop fibers connectable to output ports of an AWG.

An important criteria for the choice of monitoring wavelengths is that $\lambda_i, \lambda_{i+K}, \lambda_{i-2K}, \ldots, \lambda_{i+N-K}$+n×FSR, n≥1, wherein i=1, ..., K. Having N=32 and K=8, any one of the eight quadruples of wavelengths $\lambda_1, \lambda_9, \lambda_{17},$ and $\lambda_{25}$, +n×FSR; wavelengths $\lambda_2, \lambda_{10}, \lambda_{18},$ and $\lambda_{26}$, +n×FSR; wavelengths $\lambda_3, \lambda_{11}, \lambda_{19},$ and $\lambda_{27}$, +n×FSR; wavelengths $\lambda_4, \lambda_{12}, \lambda_{20},$ and $\lambda_{28}$, +n×FSR; wavelengths $\lambda_5, \lambda_{13}, \lambda_{21},$ and $\lambda_{29}$, +n×FSR; wavelengths $\lambda_6, \lambda_{14}, \lambda_{22},$ and $\lambda_{30}$, +n×FSR; wavelengths $\lambda_7, \lambda_{15}, \lambda_{23},$ and $\lambda_{31}$, +n×FSR; and wavelengths $\lambda_8, \lambda_{16}, \lambda_{24},$ and $\lambda_{32}$, +n×FSR may thus be chosen as the monitoring wavelengths.

A selection of monitoring wavelengths in this way, not only enables unique non-overlapping monitoring wavelengths fed into drop fibers, but also enables routing of reflected and/or backscattered wavelengths to the originating CO. This enables fault detection and localization.

The example of a remote node for a WDM-based PON as presented in FIG. 5, can be used at least for the purpose of resilience where a working OLT and a backup are located at different COs or for open access where service providers (SPs)/network providers (NPs) have separated COs, for which reason the feeder fibers are disjoint.

Figure 6:
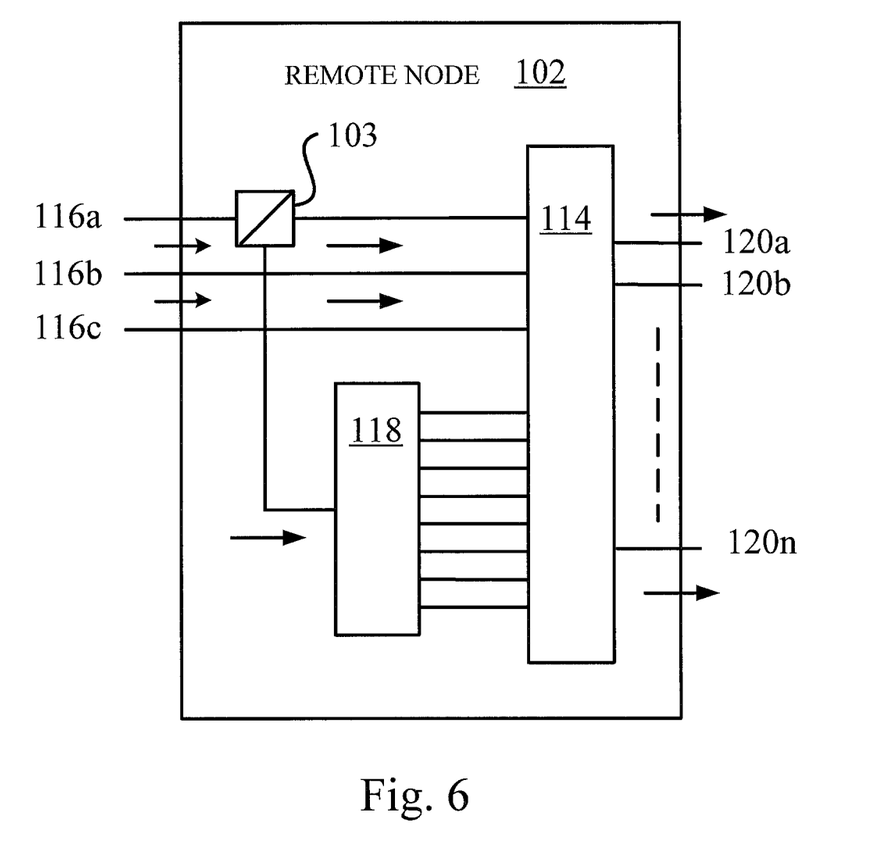

FIG. 6 schematically presents an example of a remote node according to another embodiment of the present invention.

For cases in which multiple feeder fibers are deployed in one and the same cable or duct, there is a high risk that more than one, or all, feeder fibers are cut once at least one of them is cut. If one of them is cut it is thus likely that more or all are cut. Therefore, fault monitoring may be performed only in one of the feeder fibers in order to provide a quick and a cost-efficient alternative to monitoring all feeder fibers comprised in the cable or duct.

The example of a remote node as presented in FIG. 6 is well suited for supervision approaches for WDM-based PONs with multiple FFs sharing the same path, wherein one of them is monitored only.

The remote node 102 comprises one splitter 118 that is connected to an AWG 114. A wavelength filter 103 is provided in the remote node to separate a monitoring signal from a combined monitoring signal and data signals received on a first feeder fiber 116a. The wavelength filter 103 is connected to the input of the splitter 118. Output ports of the splitter 118 are connected to input ports of the AWG 114.

The example of a remote node in FIG. 6 is configured to receive data signals on L feeder fibers 118a-c, wherein L=3. When being used, these data signals are fed into L input ports of the AWG 114. The separated monitoring signal is provided from the K output ports of the splitter 118 to K other input ports of the AWG 114.

The number of input ports the AWG for a remote node according to this example is M=K+L.

It is noted that monitoring signal is only injected into one of the L FFs, wherein L corresponds to the number of service providers (SPs) or network providers (NPs) in the same CO. Data signals may be injected into one input port of an M×N AWG, where M≤N, whereas the monitoring signal passes the splitter connected to K other input ports of the AWG. Again, to achieve a tolerable sensitivity, the splitter is typically a 1:K splitter where K≤8 and N/K is an integer. The required number of wavelengths for monitoring of all drop fibers connected to output ports of the AWG is the total number of drop fibers divided by K. In the example shown in FIGS. 6, N=32, K=8, L=3 and M=11.

Examples of monitoring wavelengths that can be used for monitoring of all drop fibers connectable to output ports of the AWG are $\lambda_i$, $\lambda_{i+K}$, $\lambda_{i+2K}$, . . . , $\lambda_{i+N-K}$+n×FSR of the AWG. For instance wavelengths $\lambda_1$, $\lambda_9$, $\lambda_{17}$, $\lambda_{25}$+n×FSR can be used.

The consideration made when choosing monitoring wavelengths for an example of a remote node according to the embodiment of FIG. 6, is the same as the one discussed above in connection with FIG. 5 where the feeder fibers were disjoint.

Figure 7:
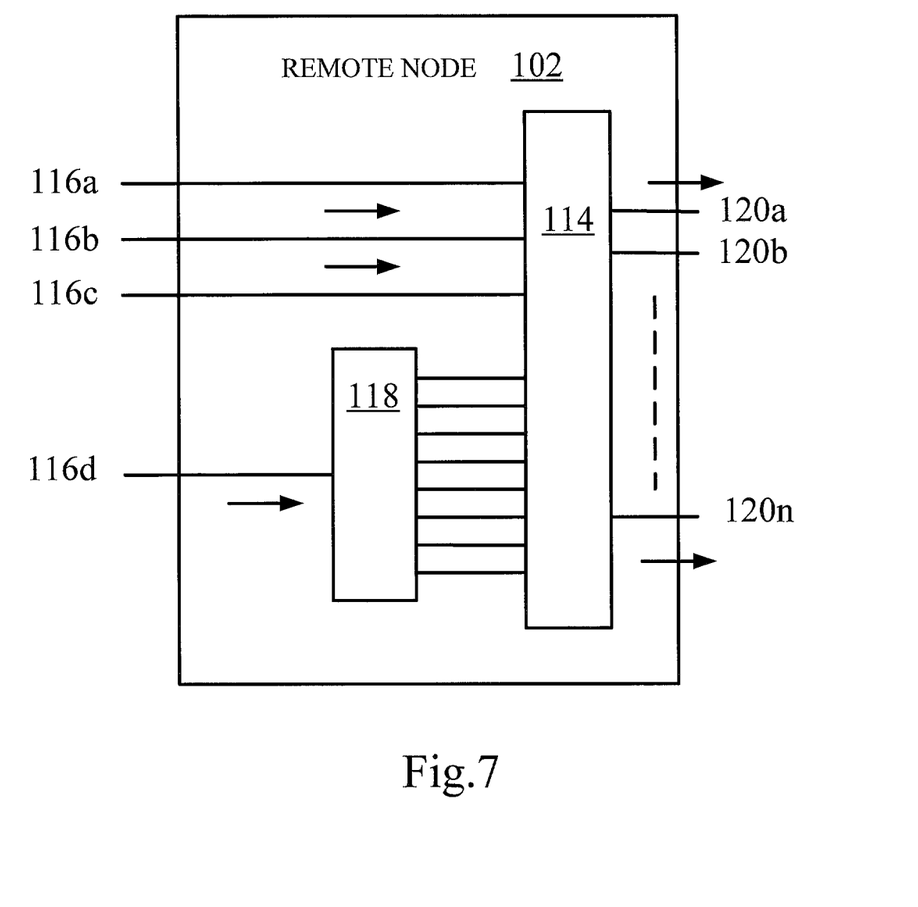

With reference to FIG. 7 an example of a remote node 102 according to another embodiment is schematically presented. The example of remote node 102 as presented in FIG. 7 is applicable to cases in which feeder fibers are located in the same cable. These feeder fibers are thus also joint.

The remote node 102 of this example is configured to receive a monitoring signal that does not pass any of L working FFs 116a-c, corresponding to L SPs/NPs in the same CO. Thus the remote node is configured to receive the monitoring signal on a non-working feeder fiber 116d.

Hence, the example of the remote node in FIG. 7 differs from the example in FIG. 6, in that the monitoring signals can be received over a non-working feeder fiber. There is thus no need for a wavelength filter to separate the monitoring signal from the data signals. This is an advantage since a wavelength filter often attenuates signals that are passed by the filter.

In addition, since data signal and the monitoring signals are not received in the same feeder fibers, there is no need for a wavelength filter configured to combine data signals and a monitoring signal on the CO side. There is thus no additional loss in the data signal path introduced in any working path due to fault monitoring.

It is illustrated that the working feeder fibers are directly connected to L input ports of an AWG 114. A 1:K splitter 118 having K output ports is connected to K other input ports of the AWG 114. The number of required input ports of the AWG, M is thus M=K+L. The required number of wavelengths of the monitoring signal for supervising all drop fibers connected to the output ports of the AWG is the total number of drop fibers N divided by K. This is very similar to the examples described above.

The choice of the wavelengths of the monitoring signal can be the same as for the examples above. The monitoring wavelengths that can be used for monitoring of all drop fibers connectable to output ports of the AWG are $\lambda_i$, $\lambda_{i+K}$, $\lambda_{i+2K}$, . . . , $\lambda_{i-N-K}$+n×FSR of the AWG. For example wavelengths $\lambda_1$, $\lambda_9$, $\lambda_{17}$, $\lambda_{25}$+n×FSR can be used.

It can be noted that for the remote node example as illustrated in FIG. 7, N=32, K=8, L=3 and M=11. As above, a different number of output ports of the splitter may be chosen, for instance K=2 or 4. A smaller value brings a lower number of simultaneously monitored drop fibers, a higher number of monitoring wavelengths required from the CO and a higher monitoring sensitivity as the monitoring signal is split to a smaller number of output ports of the splitter. K=16 may be used in theory, but would result in too low a monitoring sensitivity for practical purposes.

Figure 8:
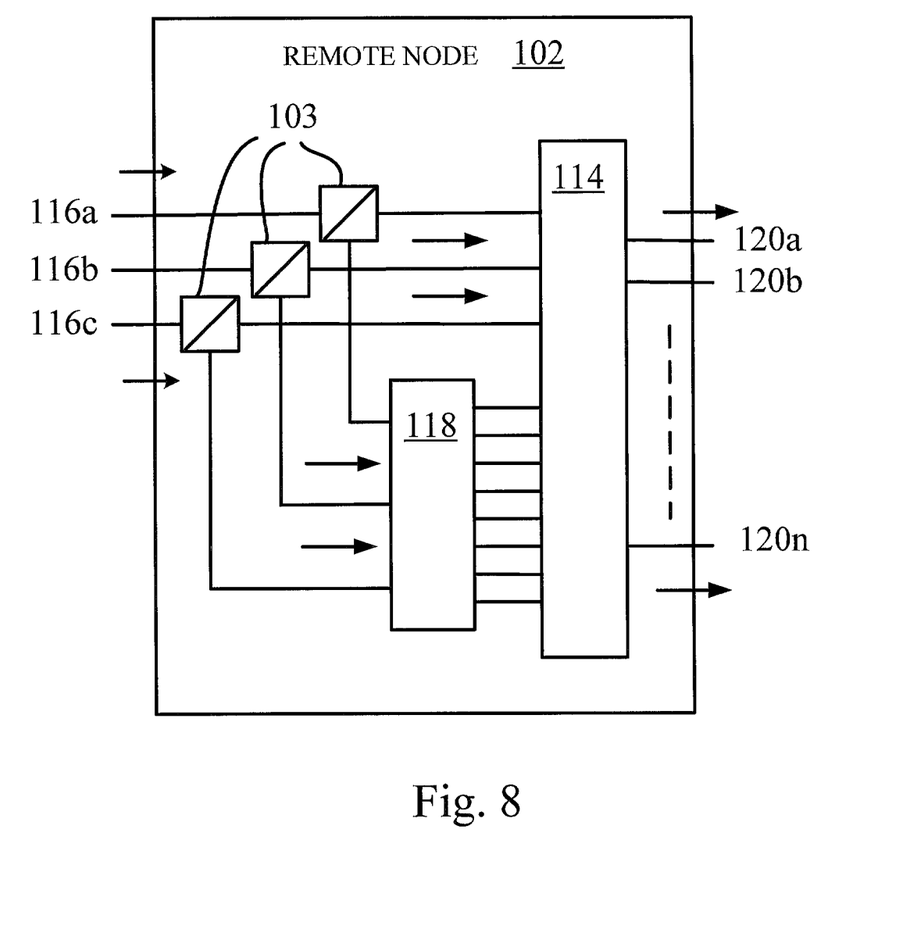

With reference to FIG. 8 an example of remote node according to yet another embodiment is presented. This remote node 102 is suitable for cases in which feeder fibers 116a-c are joint for instance located in the same trenching, and in which the feeder fibers are connected to one and the same CO. Since all feeder fibers are connected to the same CO, all feeder fibers may share a signal optical time domain reflectometry (OTDR) device and an external wavelength adaptation module (EWAN) module in the CO. An implementation of a CO may comprise a switch by which the OTDR and the EWAN can be switched between the feeder fibers of the CO. There is thus only required a single OTDR and EWAN for multiple feeder fibers.

In the case of feeder fibers in the same trenching but in different ducts, it may happen that one or more feeder fibers are cut due to for instance a failure of the associated ducts, without all feeder fibers being cut. For this reason there is a need to be able to monitor all feeder fiber paths.

Hence, an example of a remote node 102 is presented in FIG. 8, in which L feeder fibers 116a-c are connected to input ports of a AWG 114. A wavelength filter 103 is provided on each of these feeder fibers 116a-c in order to separate a monitoring signal from data signals. A splitter 118 is provided to split each monitoring signal into K monitoring signals on its output ports. The splitter is chosen to be a L:K splitter, meaning that there are L input ports and K output ports. A signal applied to any one of the L input ports is split into K output signals on the output ports of the splitter 118.

The output ports of the splitter 118 are further connected to K input ports of an AWG 114, which K input ports are different from the L input ports into which the data signals are configured to be connected.

Similar to above, the number of input ports of the AWG is thus M=K+L, and the wavelengths of the monitoring signal can be chosen in the same way as described above for the other embodiments. Thus, the monitoring wavelengths that can be used for monitoring of all drop fibers connectable to output ports of the AWG are $\lambda_i$, $\lambda_{i+K}$, $\lambda_{i+2K}$, . . . , $\lambda_{i+N-K}$+n×FSR of the AWG. For example wavelengths $\lambda_1$, $\lambda_9$, $\lambda_{17}$, $\lambda_{25}$+n×FSR can be used.

The example of the remote node as presented in FIG. 8 brings the advantage that fault detection and localization in any feeder fiber is enabled.

Figure 9:
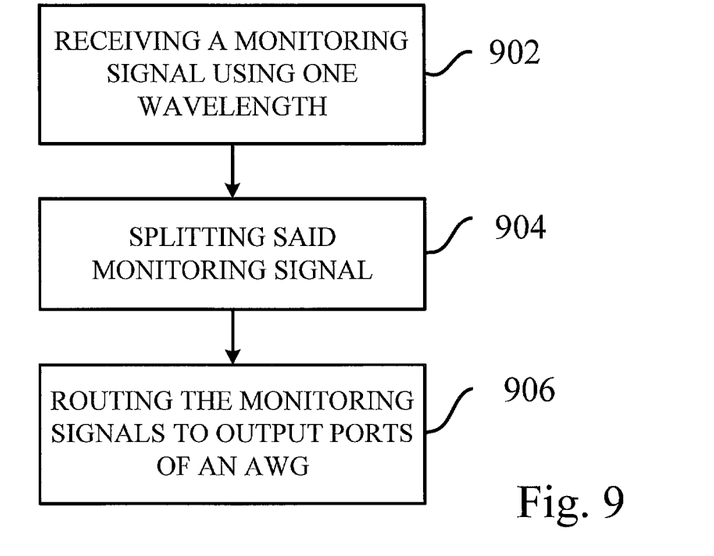
FIGS. 9 and 10 present flow diagrams schematically illustrating a method of a remote node according to embodiments of the invention.

FIG. 9 presents is a flow diagram of a method for routing of a monitoring signal in a remote node connectable to multiple feeder fibers from one one or more central offices, COs, in a WDM-based PON, according to embodiments of the invention. The method comprises receiving 902 a monitoring signal on a feeder fiber, where said monitoring signal uses one wavelength at a time out of a group of different wavelengths. The method further comprises splitting 904 said monitoring signal into split monitoring signals. It also comprises routing 906 the monitoring signals by an AWG 114 to output ports of said AWG, based on the currently used wavelength of said group of different wavelengths, for supervising drop fibers connected to the output ports.

The number of output ports of the AWG 114, divided by the number of output ports of each splitter may correspond to the number of required wavelengths in the group of wavelengths for supervising drop fibers connected to output port of the AWG.

Splitting 904 of said monitoring signal may also comprise splitting said monitoring signal into K split monitoring signals, wherein the wavelengths of the monitoring signal are such that the corresponding frequency of said wavelengths are spaced by K×Δf+n×Free Spectrum Range of the AWG, n being an integer. The relation between the frequency and the wavelength of a monitoring signal is c=λ×f, where c is the speed of light in a material in question, λ is the wavelength and f is the frequency.

The remote node (102) according to claim 1 or 2, wherein the one or more splitters (118) has K output ports, and wherein the AWG (114) has a frequency difference Δf between consecutive output ports of the AWG, wherein the wavelengths in the group of wavelengths are such that the frequencies, corresponding to said wavelengths in the group of wavelengths, are spaced by K×Δf+n×Free Spectrum Range of the AWG, n being an integer.

Letting the AWG have N output ports, FSR becomes FSR=N×Δf. Routing of the monitoring signal by an AWG has a cyclic property.

The monitoring signal in the method of routing a monitoring signal of FIG. 9 may further be an OTDR signal from said one or more COs.

The OTDR signal may further enable supervising an optical path from said one or more COs to OLTs connected to said drop fibers.

Figure 10:
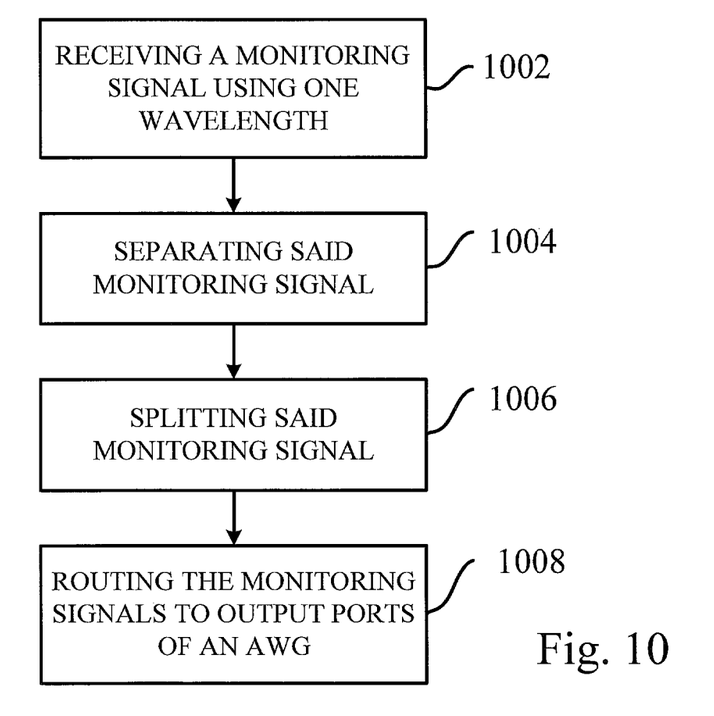

FIG. 10 presents a flow diagram of a method for routing of a monitoring signal in a remote node connectable to multiple feeder fibers from one one or more central offices, COs, in a WDM-based PON, according to a further embodiment of the invention.

In 1002 a monitoring signal is received on a feeder fiber, where said monitoring signal uses one wavelength at a time out of a group of different wavelengths. In 1004, said monitoring signal is separated from a combination of data signals and the monitoring signal. In 1006, the monitoring signal is split into split monitoring signals. In 1008 the monitoring signals are routed by an AWG 114 to output ports of said AWG, based on the currently used wavelength of said group of different wavelengths, for supervising drop fibers connected to the output ports.

Embodiments as herein described present a remote node and a method for routing of a monitoring signal wherein the monitoring signal comprises at least two different wavelengths. The number of required monitoring wavelengths depends on the number of output ports of the AWG as comprised in the remote node and the number of output ports of the splitter comprised in the remote node.

Embodiments of the present invention enables simultaneous monitoring of several drop fibers connected to output ports of an AWG.

Embodiments of the present invention propose remote node architectures of a WDM-based PONs for cost-efficient monitoring of all drop fibers connected to an AWG of said remote node supporting open access and resilience.

Embodiments of the present invention support completely passive optical data network. Any WDM-based PON having an AWG may be used, such as pure WDM-PON, hybrid WDM/TDM PON, etc.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

CO Central Office
EWAM External Wavelength Adaptation Module
FF Feeder Fiber
FSR Free Spectrum Range
OLT Optical Line Terminal
ONT Optical Network Terminal
OTDR Optical Time Domain Reflectometry
PON Passive Optical Network
RN Remote Node
TDM Time Division Multiplexing
WDM Wavelength Division Multiplexing

The invention claimed is:

1. A remote node for a wavelength division multiplexing-based passive optical network, WDM-based PON, the remote node being connectable to multiple feeder fibers from one or more central offices, COs, of the WDM-based PON, the remote node comprising:
one or more splitters each configured to receive a monitoring signal on a connected feeder fiber and to split the monitoring signal into split monitoring signals, wherein the monitoring signal uses one wavelength at a time out of a group of wavelengths; and
an arrayed waveguide grating, AWG, coupled to the one or more splitters, provided with output ports, wherein the AWG is configured to receive the split monitoring signals, and to route the split monitoring signals to the output ports of said AWG based on a currently used wavelength of said group of wavelengths, for supervising drop fibers connected to the output ports.

2. The remote node according to claim 1, wherein each splitter is provided with output ports of that splitter, and wherein the number of output ports of the AWG divided by the number of output ports of each splitter corresponds to the number of required wavelengths in the group of wavelengths for supervising the drop fibers connected to the output ports of the AWG.

3. The remote node according to claim 1, wherein each of the one or more splitters has K output ports, and wherein the AWG has a frequency difference $\Delta f$ between consecutive output ports of the AWG, wherein the wavelengths in the group of wavelengths are such that the frequencies, corresponding to said wavelengths in the group of wavelengths, are spaced by $K \times \Delta f + n \times$(free spectrum range of the AWG), n being an integer.

4. The remote node according to claim 1, further comprising one or more wavelength filters being coupled to the one or more splitters configured to separate said monitoring signal from a combination of data signals and the monitoring signal.

5. The remote node according to claim 1, wherein the monitoring signal is an optical time domain reflectometry, OTDR, signal from said one or more COs.

6. The remote node according to claim 5, wherein the OTDR signal enables supervising an optical path from said one or more COs to optical network terminals, ONTs, connected to said drop fibers.

7. A method for a remote node in a wavelength division multiplexing-based passive optical network, WDM-based PON, of routing a monitoring signal, wherein the remote node is connected to multiple feeder fibers from one or more central offices, COs, the method comprising:
  receiving a monitoring signal on a feeder fiber, said monitoring signal using one wavelength at a time out of a group of wavelengths;
  splitting said monitoring signal into split monitoring signals; and
  routing the split monitoring signals by an arrayed waveguide grating, AWG, to output ports of said AWG based on a currently used wavelength of said group of wavelengths, for supervising drop fibers connected to the output ports.

8. The method according to claim 7, wherein the number of output ports of the AWG divided by the number of the split monitoring signals corresponds to the number of required wavelengths in the group of wavelengths for supervising the drop fibers connected to the output ports of the AWG.

9. The method according to claim 7, wherein splitting said monitoring signal comprises splitting said monitoring signal into K split monitoring signals, and wherein the AWG has a frequency difference $\Delta f$ between consecutive output ports of the AWG, and wherein the wavelengths of the group of wavelengths are such that the frequencies, corresponding to said wavelengths in the group of wavelengths are spaced by $K \times \Delta f + n \times$(free spectrum range of the AWG), n being an integer.

10. The method according to claim 7, further comprising separating said monitoring signal from a combination of data signals and the monitoring signal.

11. The method according to claim 7, wherein the monitoring signal is an optical time domain reflectometry, OTDR, signal from said one or more COs.

12. The method according to claim 11, wherein the OTDR signal enables supervising of an optical path from said one or more COs to optical network terminals, ONTs, connected to said drop fibers.

* * * * *